United States Patent
Keltner

[15] 3,639,000
[45] Feb. 1, 1972

[54] SHOULDER CROSS SEATBELTS WITH CONTROLLED PASSENGER DECELERATION

[72] Inventor: Raymond O. Keltner, 8900 Pawnee Lane, Leawood, Kans. 66206

[22] Filed: Nov. 17, 1969

[21] Appl. No.: 877,290

[52] U.S. Cl. ............................................. 297/386, 297/389
[51] Int. Cl. ....................................................... A62b 35/00
[58] Field of Search ........................... 297/387, 389, 388, 386; 244/122 B; 188/94, 97; 254/48; 16/56, 51; 24/73 PH

[56] References Cited

UNITED STATES PATENTS

| | | | |
|---|---|---|---|
| 1,494,135 | 5/1924 | Robinson et al. | 297/386 X |
| 2,680,476 | 6/1954 | Saffell | 244/122.2 |
| 2,880,815 | 4/1959 | Apfelbaum | 297/386 X |
| 2,979,028 | 4/1961 | Zakely | 297/389 X |
| 3,371,960 | 3/1968 | Bayer et al. | 297/386 |

*Primary Examiner*—James T. McCall
*Attorney*—D. A. N. Chase

[57] ABSTRACT

A protective harness worn by an occupant of a vehicle which controls the deceleration of the wearer in the event of a sudden stop or decrease in the speed of the vehicle, as would occur on impact with another vehicle or a stationary object. The belts of the harness are coupled with pistons within fluid-containing cylinders anchored to the vehicle. Each piston and cylinder device permits limited movement of the harness under the momentum of the wearer, but also produces a braking action to oppose such movement and arrest the harness, thereby subjecting the wearer to a reduced rate of deceleration rather than a sudden stop. The device may be conveniently released by the wearer to permit free movement when desired or necessary, and the harness construction assures that the belts will ride flatly against the body of the wearer.

15 Claims, 8 Drawing Figures

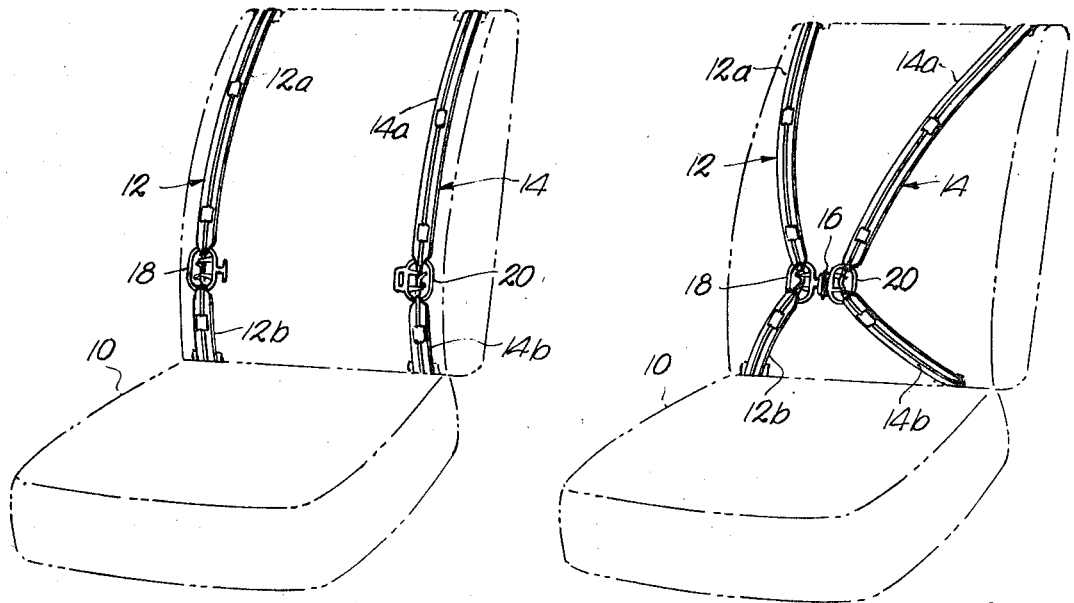
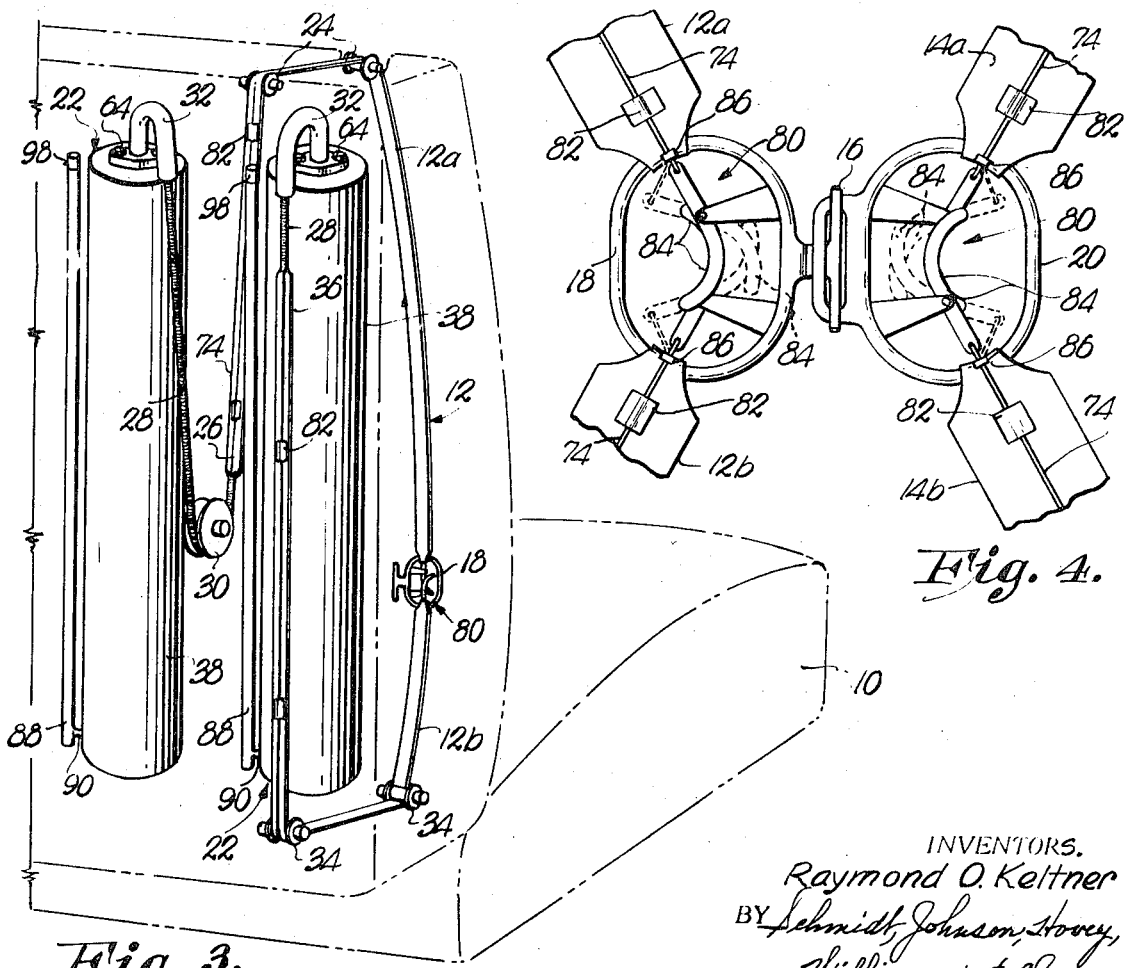
INVENTORS.
Raymond O. Keltner
BY Schmidt, Johnson, Hovey,
Williams & Chase
ATTORNEYS.

INVENTOR.
Raymond O. Keltner
BY Schmidt, Johnson, Hovey,
Williams & Chase
ATTORNEYS.

3,639,000

SHOULDER CROSS SEATBELTS WITH CONTROLLED PASSENGER DECELERATION

This invention relates to improvements in protective restraining apparatus for an occupant of a vehicle and, more particularly, to a harness utilized with braking means that subjects the wearer of the harness to a controlled rate of deceleration in the event of a collision.

The death rate from automobile accidents is tragically high, particularly when high speeds are involved and in head-on-type collisions. Although conventional seat belts and the introduction of the shoulder harness have materially contributed to the reduction of severe and fatal injuries, the protection afforded against severe injury or death in the event of a head-on collision is minimal when only seat belts are worn and only somewhat improved with a shoulder harness.

One reason for the relative inability of simple seat belts and harnesses to adequately protect the wearer against the likelihood of serious injury or death in a head-on collision is that the belts or harnesses are rigid and anchored to the frame of the vehicle to preclude any possible movement thereof under the momentum of the wearer. Therefore, on impact, the wearer is either firmly held (by tightly fitting belts) or thrown against the belts and firmly held without any forward movement once the slack is taken up. Although he may be prevented from striking the dashboard or windshield, the trauma and shock of a sudden stop may cause a neck fracture, rupture of vital organs and blood vessels, and generate shock waves within the head and body, any of which are equally as fatal as the obvious hazards present were no belts or harnesses worn at all.

It is, therefore, the primary object of the present invention to provide protective restraining apparatus which reduces the rate of deceleration of an occupant of a vehicle in the event of a sudden stop or decrease in speed.

As a corollary to the foregoing object, it is an important aim of this invention to provide apparatus as aforesaid which permits limited movement of the wearer of a harness in the event of impact but, at the same time, arrests the harness by a braking action to control the deceleration of the wearer.

Another important object of the invention is to provide apparatus as aforesaid in which the braking force is at a minimum at the outset of initial movement of the harness (under the momentum of the wearer) but increases during such initial movement to progressively decrease the rate of deceleration.

Still another important object of the invention is to provide apparatus as aforesaid which utilizes a piston and cylinder assembly to effect the braking action, the piston having a control orifice and comprising two mating sections arranged to produce the desired braking action and also permit release of the brake when desired.

Accordingly, it is an important objective of this invention to provide such apparatus in which the harness may be readily released from the brake by the wearer to permit free movement and adjustment.

Yet another important object of the invention is to provide apparatus as aforesaid having the releasable feature but, should a collision occur while the brake is released, which overrides the release and is automatically operative.

Additionally, it is an objective of this invention to provide apparatus as aforesaid having means which assures that the belts of the harness will ride flatly on the body of the wearer.

In the drawings:

FIG. 1 is a front perspective view showing a seat of a vehicle in phantom lines with the belts of the present invention overlying the seat when not in use;

FIG. 2 is a view similar to FIG. 1 but showing the belts locked together in their normal position assumed during use when the seat is occupied;

FIG. 3 is an enlarged, rear perspective view of the seat showing the latter in phantom lines and the braking devices mounted within the back of the seat;

FIG. 4 is a further enlarged, plan view of the manually operable release mechanism, ring couplings and latch that interlocks the belts;

Figure 5:
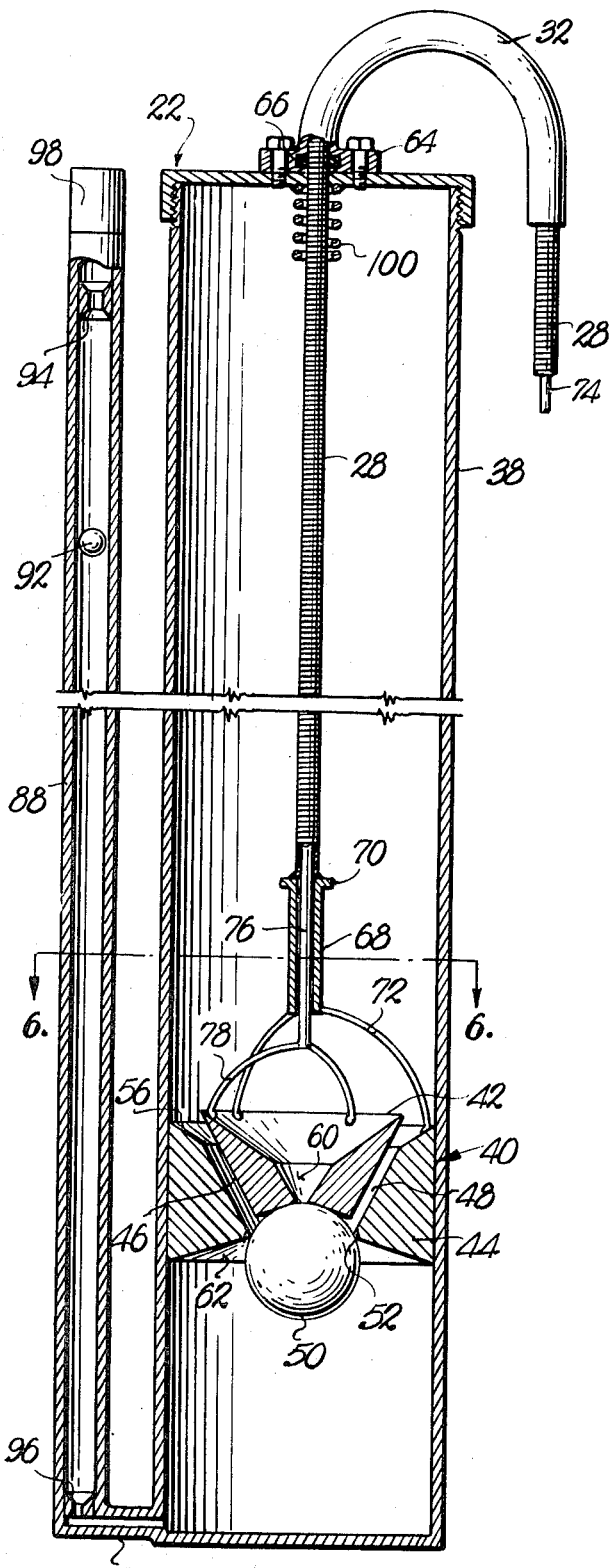
FIG. 5 is a longitudinal sectional view of one of the piston and cylinder braking devices on an enlarged scale as compared with FIG. 3 and illustrating the two sections of the piston in their normal positions, the spherical element and the coaxial operating cable being shown in elevation for clarity.
Figure 6:
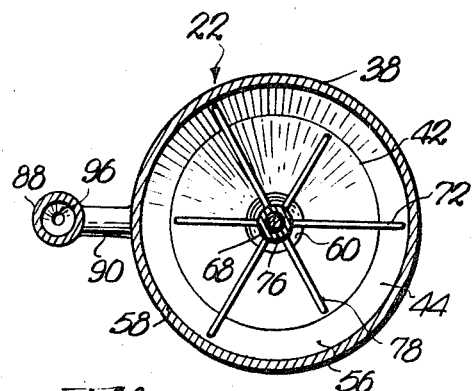
FIG. 6 is a cross-sectional view taken along line 6—6 of FIG. 5.

Referring to FIGS. 1–3, a harness is shown on the back of a seat 10 of an automobile, truck, or other vehicle. The harness comprises a pair of belts 12 and 14 which, in use, are interconnected by a latch 16 (FIG. 2) to form a harness that extends over the shoulders and crosses in front of the wearer, the latch 16 being located at the waist or the lower thorax. When in nonuse, the belts 12 and 14 neatly overlie the front of the seat back as shown in FIG. 1.

The belt 12 has a flat, upper belt member 12a and a flat, lower belt member 12b, the proximal ends of the belt members 12a and 12b being interconnected by a ring 18. Similarly, the other belt 14 consists of flat, upper and lower belt members 14a and 14b interconnected at their proximal ends by a coupling ring 20. The latch 16 is formed on the rings 18 and 20 as is clear in FIG. 4 where it may be seen that the latch 16 comprises an eye on the ring 20 that receives a T-bar projecting from the ring 18. The inner ends of the belt members 12a and 12b, and 14a and 14b are looped over the respective rings 18 and 20 so that the belt members are freely slidable on the rings, as may be appreciated by a comparison of FIG. 1 and FIG. 2 or 4.

The belt 12 is connected to a pair of braking devices 22 (FIG. 3) suitably mounted within the seat back and anchored to the frame of the vehicle. Each of the devices 22 comprises permit upright piston and cylinder assembly of special construction to be hereinafter described in detail. The outer ends of the belt 14 are connected to two additional devices 22 (not shown) mounted in the other half of the seat back not illustrated in FIG. 3. Since the arrangement is identical for each of the belts 12 and 14, only the coupling of the belt 12 to its associated pair of braking devices 22 is illustrated herein. It should be understood that, where vertical space is available elsewhere, the devices 22 need not be located within the seat back, this particular location being illustrated herein since the back of the seat provides a vertical space for the upright cylinders and minimizes the length of the belts. Regardless of location, however, it is important that the devices 22 be anchored to the frame of the vehicle so that relative movement of the devices 22 and the vehicle structure will not occur in the event of a collision.

The upper belt member 12a enters the seat back at the top thereof and is trained over a pair of guide rollers 24 to direct the belt member downwardly to its termination 26 where it is joined to a hollow cable 28 trained around a guide pulley 30. The cable 28 then extends upwardly and is received within an inverted, U-shaped guide tube 32 at the top of the left braking device 22. In an analogous manner, the lower belt member 12b enters the seat back at the bottom thereof and is trained around a pair of rollers 34 to direct the member 12b upwardly, it being connected at its termination 36 to the cable 28 extending from the guide tube 32 of the right braking device 22.

One of the braking devices 22 is illustrated in detail in FIGS. 5–8. An upright cylinder 38 is filled with a stable fluid (not shown) such as a lightweight oil or other nonfreezing and nonvolatile fluid. A piston 40 in the cylinder 38 is of two-piece construction and comprises an inner section 42 and an annular, outer section 44. As viewed in plan (FIG. 6) the inner section 42 is circular in configuration; the longitudinal section of FIG. 5 reveals the inverted, frustoconical shape of the inner section 42 as viewed in transverse cross section. The outer, lateral surface 46 of the inner section 42 mates with the internal surface 48 of the annular outer section 44 when the sections are closed against each other, as is evident in FIG. 8. It is, therefore, clear that the mating surfaces 46 and 48 are of inverted, frustoconical configuration, a fluid passage through the piston 40 of variable size being defined by the two surfaces 46 and 48 in accordance with the degree of separation of the two sections 42 and 44.

A buoyant element 50 in the form of a hollow sphere is disposed beneath the piston 40 and, when the piston is in its normal position shown in FIG. 5, the element 50 elevates the inner section 42 by engagement therewith through the circular bottom opening 52 in the outer section 44. Passage of fluid around the element 50 is provided by a series of apertures 54 circumferentially spaced around the edge of the opening 52.

Figure 8:
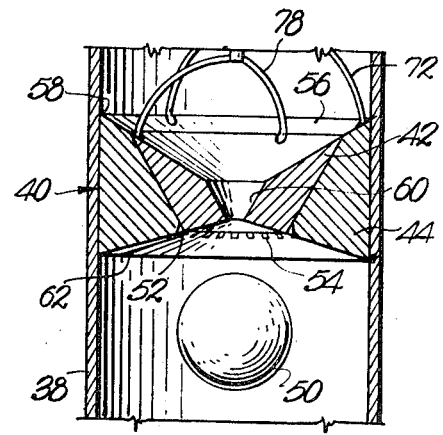
FIG. 8 is a fragmentary view of the piston and cylinder assembly similar to FIG. 5, the sections of the piston being shown closed against each other shortly after a collision.

With particular reference to FIG. 8, the configuration of the face 56 of the head of the piston 40 (when the surfaces 46 and 48 are mated) is clearly illustrated. The face 56 has a frustoconical taper extending radially inwardly from the annular outer edge 58. Thus, the central portion of the inner section 42 is substantially recessed with respect to the outer edge 58, a frustoconical orifice 60 being provided at such central portion communicating the fluid on opposite sides of the piston 40 when the inner section 42 is spaced above the element 50. In this respect, it should be noted that the element 50 in elevating the inner section 42 (FIG. 5) closes the orifice 60 as the element 50 seats in the cone-shaped, recessed bottom of the inner section 42. The bottom 62 of the outer section 44 is also conically recessed to guide the element 50 into the bottom opening 52.

The flexible, hollow cable 28 is directed by the guide tube 32 through an opening in the top of the cylinder 38, the tube 32 being secured to the top of the cylinder 38 by a flange and bolt mounting 64 provided with a suitable seal 66 to prevent the escape of fluid from the cylinder 38. The inner end of the cable 28 is attached to the top of a sleeve 68 provided with an integral collar 70. The bottom of the sleeve 68 is welded or otherwise secured to three wirelike connecting components 72 which extend downwardly and are rigidly joined to the outer piston section 44 at the head thereof.

A wire lead 74 is slidably received within the hollow cable 28 and is secured to a reciprocable rod 76 extending through the sleeve 68. The lower end of the rod 76 is joined to three wirelike components 78 which extend downwardly and are attached to the inner piston section 42 adjacent the upper edge thereof. It may be appreciated, therefore, that a coaxial cable is formed by the hollow cable 28 and internal lead 74. As discussed above with reference to FIG. 3, the outer cable 28 is joined to one of the ends of the belt 12; however, the lead 74 extends through the cable 28, and is carried by the belt 12 to a release mechanism 80 (FIG. 4) mounted within the coupling ring 18. Spaced guides 82 along the belt 12 serve to hold each of the leads 74 on the belt 12 while permitting longitudinal movement thereof. This same arrangement is employed with respect to the other belt 14.

Each of the release mechanisms 80 comprises a pair of curved lever arms 84 pivotally mounted intermediate their ends within the ring 18 or 20. Each lead 74 extends through an eyelet 86 at the end of the associated belt member and is attached to the proximal end of the respective arm 84. As may be appreciated from a comparison of the full and broken line illustrations in FIG. 4, grasping and squeezing the arms 84 of the two mechanisms 80 shifts the arms to the broken line positions to, in turn, pull the leads 74.

Referring again to FIG. 5, an auxiliary supply cylinder 88 is disposed in side-by-side relationship to the cylinder 38, the bottom end of the supply cylinder 88 being communicated with the bottom of the cylinder 38 by a conduit 90. A valve ball 92 of lesser diameter than the internal diameter of the cylinder 88 is disposed therewithin and floats at the elevation of the fluid level. An upper seat 94 for the ball 92 is formed adjacent the upper end of the cylinder 88, and a second valve seat 96 is provided at the lower end of the cylinder 88. The upper end of the cylinder 88 is open to atmosphere except for the presence of a removable air filter 98 which prevents the ingress of foreign matter.

A coil spring 100 is telescoped over the cable 28 in cylinder 38 and has its upper end secured to the top of the cylinder 38 around the opening through which the cable 28 extends. The spring 100 serves as a yieldable stop for the piston 40, being engaged by the collar 70 on the sleeve 68 if the piston 40 approaches the top of the cylinder 38.

OPERATION

Each of the braking devices 22 is filled with fluid through the upper end of its supply cylinder 88. The air filter 98 is removed for filling, it being appreciated that the valve ball 92 is initially against the lower seat 96. As fluid enters the supply cylinder 88, the ball 92 rises with the level of the fluid to permit passage thereof through the conduit 90 and into the main cylinder 38. Being smaller in diameter than the internal diameter of the supply cylinder 88, incoming fluid flows around the valve ball 92 during the filling process. Besides serving as a convenient means of filling or replenishing the main cylinder 38, the supply cylinder 88 also serves to compensate for the difference in the fluid displace from the main cylinder 38 when the piston 40 is in its normal position (FIG. 5) and in a position adjacent the top of the cylinder 38. This difference in displacement is caused by the substantial change in the length of the cable 28 within the cylinder 38 between upper and lower positions of the piston 40.

Assuming that a passenger is occupying seat 10 with the belts 12 and 14 interlocked by the latch 16 as illustrated in FIGS. 2 and 4, the belts 12 and 14 assume a normal position in relatively tight-fitting relationship to the wearer due to the action of the piston 40 under the force of gravity. The piston 40 descends in the cylinder 38 until the slack in the cable 38 is taken up, the speed of the downward movement of the piston 40 being increased by the action of the buoyant element 50 which separates the inner and outer piston sections 42 and 44 as illustrated in FIG. 5. It may be seen that a conical passage between the spaced surfaces 46 and 48 communicates the fluid above and below the piston 40 thereby permitting the latter to descend relatively rapidly until the cable 28 is tight.

Figure 7:
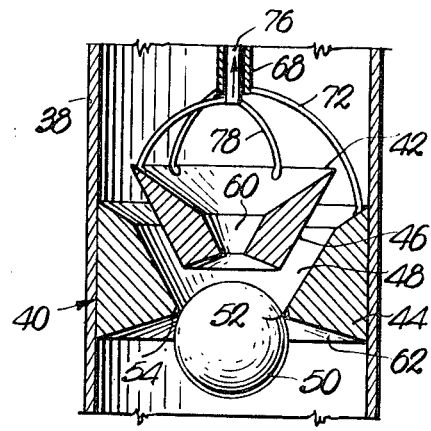
FIG. 7 is a fragmentary view of the piston and cylinder similar to FIG. 5, the sections of the piston being illustrated in their relative positions assumed upon actuation of the release mechanism.

FIG. 7 shows the relative positions of the inner and outer piston sections 42 and 44 during the prior raising of the piston 40 incident to releasing the belts 12 and 14 sufficiently to permit the passenger to become comfortably seated and lock the belts 12 and 14 together. The arrow in FIG. 7 indicates the upward movement of the inner section 42 caused by actuation of the respective release mechanism 80. As the lead 74 coupled with the inner section 42 is pulled longitudinally by the mechanism 80, the rod 76 shifts upwardly to, in turn, raise the section 42 away from the section 44 and increase the spacing between the surfaces 46 and 48. This condition within all of the devices 22 associated with the belts 12 and 14 allows the latter to be freely extended and manipulated by the wearer since each of the pistons 40 does not significantly impede the withdrawal of the cable 28 to which it is attached. In this respect, it should be understood that quick upward movement of the cable 28 separates the outer piston section 44 from the buoyant element 50 so that the bottom opening 52 is now completely open to fluid flow. During subsequent decent of the piston 40 discussed above, the opening 52 is closed and flow is restricted to the apertures 54.

The normal spacing of the piston sections 42 and 44 and the presence of the apertures 54 allow the piston 40 to adjust its position upwardly or downwardly (though at a relatively slower rate) with the normal movements of the occupant of the seat 10. However, in the event of a sudden stop or decrease in the speed of the vehicle, as would occur on impact with another vehicle or a stationary object, the sudden upward force on the cable 28 within the cylinder 38 closes the passage through the piston 40 as is illustrated in FIG. 8. With the surfaces 46 and 48 now in mating interengagement, the central orifice 60 in the inner section 42 is the only passage remaining for fluid flow from above to below the piston 40. The orifice 60 is now open since the rapid upward movement of the piston 40 separates the latter from the buoyant element 50 as illustrated.

In studying the action of the piston sections 42 and 44 at the time of impact, it may be appreciated that the resistance of the piston 40 to movement is minimum at the time of impact and then progressively increases during initial upward movement of the piston 40 as the surfaces 46 and 48 close against each other. Once the surfaces 46 and 48 are mated, the resistance of the piston 40 is at a maximum and remains at this level until, in the case of a severe impact, the collar 70 engages the spring stop 100 at the top of the cylinder 38. Therefore, the harness provided by the belts 12 and 14 is permitted to move to an extended position under the momentum of the wearer but such movement is controlled by the braking action of the piston 40 in order to reduce the rate of deceleration of the wearer's body. The deceleration is reduced in a controlled manner, less at the outset and then limited to a progressively greater degree, and finally the opposing force of the piston 40 is held at a constant magnitude by the fixed size of the orifice 60 until the harness (and hence the wearer thereof) is arrested.

It should be noted that the cone shape of the face 56 of the pistonhead contributes to smooth flow of the fluid thereover to the central orifice 60. The frustoconical configuration of the surfaces 46 and 48 similarly contributes to smooth operation of the piston 40, particularly just after impact when the passage normally existing between the surfaces 46 and 48 is closing to retard the piston.

An important feature of the piston design is that automatic override of the release is inherent in the construction. If the piston sections 42 and 44 are in the positions shown in FIG. 7, as might be the case during use of the harness if the wearer desires to bend forward in the seat, lean over, etc., a sudden impact will still effect the reuniting of the sections 42 and 44 since the sudden pull on the cable 28 raises the outer section 44 relative to the inner section 42 in the same manner as before, the only difference being that the annular passage within the piston 40 is initially larger due to the greater separation of the surfaces 46 and 48.

It is also important to note that the belts 12 and 14 lie flatly against the body of the wearer at all times. This is assured by the rings 18 and 20, the inner ends of the belt members 12a and 12b, and 14a and 14b being freely slidable thereon so that the belts conform to the wearer's body configuration regardless of the position of the belts.

The size of the central orifice 60, the angle of the cone-shaped surfaces 46 and 48, other geometric and dimensional relationships, and the viscosity of the fluid may be varied to produce the programmed braking force desired. The braking program may be based on a selected maximum vehicle speed and maximum weight of the passenger, thus design variations are contemplated in accordance with these parameters. Furthermore, the use of horizontally oriented cylinders rather than upright and gas under pressure as the fluid medium is contemplated in the present invention since the basic braking action of the piston 40 would still be obtainable. However, it is evident that a horizontally disposed cylinder could not rely on gravity to return the piston 40 to its normal position or to center the buoyant element 50, thus the addition of a spring return mechanism or other suitable means would be necessary. For this reason, the upright cylinder configuration is shown and described herein as the preferred construction.

Having thus described the invention, what is claimed as new and desired to be secured by Letters Patent is:

1. Protective restraining apparatus for an occupant of a vehicle, said apparatus comprising:
   belt means adapted to be worn by said occupant and having a normal position in which the belt means is in relatively tight-fitting relationship to the occupant;
   a braking device adapted to be anchored to said vehicle; and
   means coupling said belt means to said device for movement away from said normal position under the momentum of the occupant and against the action of said device in response to a sudden stop or decrease in the speed of the vehicle,
   said device providing a force opposing said movement of the belt means to arrest the latter and limit said movement to a predetermined, extended position of the belt means, whereby to control the deceleration of the occupant,
   said device including a cylinder having a fluid therein, and a piston in said cylinder movable in said fluid,
   said coupling means connecting said belt means with said piston for movement of the piston with the belt means as the latter is shifted away from its normal position under the momentum of the occupant,
   said piston having an orifice therein communicating the fluid on both sides of the piston to limit the rate of movement of the piston and thereby apply said opposing force to the belt means to arrest the latter,
   said piston further having a head provided with a concave face circumscribed by an annular edge,
   said orifice communicating with said face centrally thereof radially inwardly from said edge.

2. The apparatus as claimed in claim 1,
   said device having means increasing the magnitude of said force during said movement of the belt means away from said normal position.

3. The apparatus as claimed in claim 2,
   said force being of minimum magnitude at the outset of said movement of the belt means away from its normal position.

4. The apparatus as claimed in claim 1,
   said force being of minimum magnitude at the outset of initial movement of said belt means away from its normal position,
   said device having means progressively increasing the magnitude of said force during said initial movement.

5. The apparatus as claimed in claim 1, and means coupled to said device for releasing the latter to permit relatively free movement of said belt means away from its normal position.

6. The apparatus as claimed in claim 1, said face and said orifice being frustoconical and of progressively less diameter radially inwardly from said edge.

7. Protective restraining apparatus for an occupant of a vehicle, said apparatus comprising:
   belt means adapted to be worn by said occupant and having a normal position in which the belt means is in relatively tight-fitting relationship to the occupant;
   a braking device adapted to be anchored to said vehicle;
   means coupling said belt means to said device for movement away from said normal position under the momentum of the occupant and against the action of said device in response to a sudden stop or decrease in the speed of the vehicle,
   said device providing a force opposing said movement of the belt means to arrest the latter and limit said movement to a predetermined, extended position of the belt means, whereby to control the deceleration of the occupant,
   said device including a cylinder having a fluid therein, and a piston in said cylinder movable in said fluid and having relatively shiftable inner and outer sections provided with mating surfaces,
   said coupling means connecting said belt means with one of said sections for movement of the piston with the belt means as the latter is shifted away from its normal position under the momentum of the occupant,
   the other of said sections having an orifice therein communicating the fluid on both sides of the piston to limit the rate of movement of the piston and thereby apply said opposing force to the belt means to arrest the latter; and
   means normally maintaining said sections apart from each other to space said surfaces and thereby provide a fluid passage through the piston in addition to said orifice, said surfaces closing into mating interengagement upon movement of said one section with the belt means, whereby to close said passage after initial movement of said one section to retard the rate of movement of the piston.

8. Protective restraining apparatus for an occupant of a vehicle, said apparatus comprising:

belt means adapted to be worn by said occupant and having a normal position in which the belt means is in relatively tight-fitting relationship to the occupant;

a braking device adapted to be anchored to said vehicle;

means coupling said belt means to said device for movement away from said normal position under the momentum of the occupant and against the action of said device in response to a sudden stop or decrease in the speed of the vehicle, said device providing a force opposing said movement of the belt means to arrest the latter and limit said movement to a predetermined, extended position of the belt means, whereby to control the deceleration of the occupant, said device including a cylinder having a fluid therein, and a piston in said cylinder movable in said fluid and having relatively shiftable inner and outer sections provided with mating surfaces, said coupling means connecting said belt means with one of said sections for movement of the piston with the belt means as the latter is shifted away from its normal position under the momentum of the occupant, the other of said sections having an orifice therein communicating the fluid on both sides of the piston to limit the rate of movement of the piston and thereby apply said opposing force to the belt means to arrest the latter; and release means actuatable by the occupant and coupled to said other section for shifting the latter relative to said one section to space said surfaces apart a sufficient distance to provide a large fluid passage through the piston relative to the size of said orifice, whereby to permit relatively free movement of the belt means away from its normal position.

9. Protective restraining apparatus for an occupant of a vehicle, said apparatus comprising:

belt means adapted to be worn by said occupant and having a normal position in which the belt means is in relatively tight-fitting relationship to the occupant;

a braking device adapted to be anchored to said vehicle;

means coupling said belt means to said device for movement away from said normal position under the momentum of the occupant and against the action of said device in response to a sudden stop or decrease in the speed of the vehicle, said device providing a force opposing said movement of the belt means to arrest the latter and limit said movement to a predetermined, extended position of the belt means, whereby to control the deceleration of the occupant, said device including a cylinder having a fluid therein, and a piston in said cylinder movable in said fluid, said coupling means connecting said belt means with said piston for movement of the piston with the belt means as the latter is shifted away from its normal position under the momentum of the occupant, said piston having an orifice therein communicating the fluid on both sides of the piston to limit the rate of movement of the piston and thereby apply said opposing force to the belt means to arrest the latter, said cylinder being upright and said piston being reciprocable therein upwardly and downwardly, said piston including relatively shiftable inner and outer sections having mating, inverted frustoconical surfaces, said coupling means being connected to said outer section to effect upward movement thereof with the belt means as the latter is shifted away from its normal position, said inner section having said orifice therein; and a buoyant element beneath said piston normally engaging the latter to hold said sections apart and space said surfaces to thereby provide a fluid passage through the piston in addition to said orifice, said surfaces closing into mating interengagement upon upward movement of said outer section, whereby to close said passage after initial upward movement of said outer section to retard the rate of movement of the piston.

10. Protective restraining apparatus for an occupant of a vehicle, said apparatus comprising:

belt means adapted to be worn by said occupant and having a normal position in which the belt means is in relatively tight-fitting relationship to the occupant;

a braking device adapted to be anchored to said vehicle;

means coupling said belt means to said device for movement away from said normal position under the momentum of the occupant and against the action of said device in response to a sudden stop or decrease in the speed of the vehicle, said device providing a force opposing said movement of the belt means to arrest the latter and limit said movement to a predetermined, extended position of the belt means, whereby to control the deceleration of the occupant, said device including a cylinder having a fluid therein, and a piston in said cylinder movable in said fluid, said coupling means connecting said belt means with said piston for movement of the piston with the belt means as the latter is shifted away from its normal position under the momentum of the occupant, said piston having an orifice therein communicating the fluid on both sides of the piston to limit the rate of movement of the piston and thereby apply said opposing force to the belt means to arrest the latter, said cylinder being upright and said piston being reciprocable therein upwardly and downwardly, said piston including relatively shiftable inner and outer sections having mating, inverted frustoconical surfaces, said coupling means being connected to said outer section to effect upward movement thereof with the belt means as the latter is shifted away from its normal position, said inner section having said orifice therein; and release means actuatable by the occupant and coupled to said inner section for raising the latter relative to said outer section to space said surfaces apart a sufficient distance to provide a large fluid passage through the piston relative to the size of said orifice, whereby to permit relatively free movement of the belt means away from its normal position.

11. Protective restraining apparatus for an occupant of a vehicle, said apparatus comprising:

belt means adapted to be worn by said occupant and having a normal position in which the belt means is in relatively tight-fitting relationship to the occupant;

a braking device adapted to be anchored to said vehicle;

means coupling said belt means to said device for movement away from said normal position under the momentum of the occupant and against the action of said device in response to a sudden stop or decrease in the speed of the vehicle, said device providing a force opposing said movement of the belt means to arrest the latter and limit said movement to a predetermined, extended position of the belt means, whereby to control the deceleration of the occupant, said device including a cylinder having a fluid therein, and a piston in said cylinder movable in said fluid, said coupling means connecting said belt means with said piston for movement of the piston with the belt means as the latter is shifted away from its normal position under the momentum of the occupant, said piston having an orifice therein communicating the fluid on both sides of the piston to limit the rate of movement of the piston and thereby apply said opposing force to the belt means to arrest the latter; and a yieldable stop in said cylinder at one end thereof in the path of movement of said piston.

12. Protective restraining apparatus for an occupant of a vehicle, said apparatus comprising:

belt means adapted to be worn by said occupant and having a normal position in which the belt means is in relatively tight-fitting relationship to the occupant;

a braking device adapted to be anchored to said vehicle; and means coupling said belt means to said device for movement away from said normal position under the momentum of the occupant and against the action of said device in response to a sudden stop or decrease in the speed of the vehicle, said device providing a force opposing said movement of the belt means to arrest the latter and limit said movement to a predetermined, extended position of the belt means, whereby to control the deceleration of the occupant, said belt means including a pair of belts, each of said belts comprising a pair of flat belt members and a ring interconnecting said members, said rings being provided with a latch for interconnecting the belts to present a harness crossing in front of the occupant, said members being slidable on the respective rings to allow the members to ride flatly on the body of the occupant.

13. Protective restraining apparatus for an occupant of a vehicle, said apparatus comprising:

belt means adapted to be worn by said occupant and having a normal position in which the belt means is in relatively tight-fitting relationship to the occupant;

a braking device adapted to be anchored to said vehicle;

means coupling said belt means to said device for movement away from said normal position under the momentum of the occupant and against the action of said device in response to a sudden stop or decrease in the speed of the vehicle, said device providing a force opposing said movement of the belt means to arrest the latter and limit said movement to a predetermined, extended position of the belt means, whereby to control the deceleration of the occupant, said belt means including a belt having a pair of ends, said coupling means connecting one of said ends with said device, there being a second of said devices; and means operably connecting the other of said ends with said second device.

14. The apparatus as claimed in claim 8, said release means including a flexible lead extending along said belt means and connected with said other section, and a manually operable mechanism on said belt means coupled with said lead for actuating the latter.

15. The apparatus as claimed in claim 9, the frustoconical surface of said outer section defining a circular opening in the bottom of said outer section, said element being of spherical configuration, greater in diameter than said opening and normally received therewithin, said outer section having a series of apertures therein circumferentially spaced around said opening to communicate said passage with the fluid beneath the piston when the element is received within said opening.

* * * * *